2,979,477
Patented Apr. 11, 1961

2,979,477
COMPOSITION COMPRISING A VINYLPYRIDINE POLYMER AND A HYDANTOIN FORMALDEHYDE CONDENSATION POLYMER

Edwin H. Land, Cambridge, Mass., assignor to Polaroid Corporation, Cambridge, Mass., a corporation of Delaware No Drawing. Filed May 8, 1958, Ser. No. 733,845

17 Claims. (Cl. 260—29.4)

This invention relates to a novel mixture of materials useful in the formation of protective coatings and to a novel solution of such materials for either protecting or protecting and washing diverse objects, for example, photographic images.

Objects of the present invention are: to provide as a protective coating for diverse objects, a novel composition of matter comprising a mixture of a vinylpyridine polymer and a hydantoin formaldehyde condensation poylmer; and to provide, for producing such a protective coating, a novel composition of matter comprising a solution of these polymers and an acid in water and a water-miscible organic solvent, the acid, the water and the water-miscible organic solvent cooperating to dissolve the polymers.

Other objects of the invention will in part be obvious and will in part appear hereinafter.

The invention accordingly comprises the composition possessing the features, properties and relation of elements which are exemplified in the following detailed disclosure, and the scope of the application of which will be indicated in the appended claims.

The compositions of matter contemplated by the present invention generally comprise mixtures of compatible components which, together, possess properties not possessed by the components themselves. These components include a vinylpyridine polymer and a hydantoin condensation polymer. The vinylpyridine polymer and the hydantoin condensation polymer function primarily to impart to the protective coatings containing the composition the following unusual summation of properties: substantial impermeability to water; stability throughout wide temperature and humidity ranges; resistance to the effects of prolonged solar radiation; optical clarity; and nontackiness.

Aqueous dispersions of such components are particularly useful in improving the stability of extremely thin silver transfer reversal images of the type which may be produced by applying a processing composition containing a silver halide developer and a silver halide solvent to a photoexposed photosensitive silver halide element and an image-receptive element that are in superposed relation. The processing composition acts to reduce exposed silver halide to silver, to react with unreduced silver halide to form a water-soluble, complex silver salt, to transfer it to the image-receptive element, and there, to reduce it to silver.

An extremely thin, photographic silver image of the foregoing type ordinarily retains traces of the photographic reagents with which it has been processed and the continued presence of which may adversely affect its stability. For example, silver may be oxidized by sulfur from the residue of sodium thiosulfate that has been employed as a solvent. Also, silver may be oxidized by such agents as hydrogen sulfide, often present in the atmosphere. Furthermore, traces of unoxidized developer if oxidized by atmospheric oxygen, may slightly discolor the highlights of the image.

It has been proposed, in order to improve the stability of such an image, to coat it with a composition comprising an aqueous dispersion of a film-forming material. The water acts to wash traces of the photographic reagent from the image and to so distribute the film-forming that it provides the image with a protective coating when the dispersion is dried. Processes of the foregoing type are more fully described in U.S. Patent No. 2,719,791, issued to Edwin H. Land on October 4, 1955.

In accordance with the present invention, a preferred composition for this purpose, as well as for a variety of other purposes, comprises a dispersion prepared from (1) a vinylpyridine polymer, (2) a hydantoin formaldehyde condensation polymer, (3) water, (4) a water-miscible organic solvent and (5) an acid. This dispersion, because of its aqueous character, is readily adapted to dissolve residual water-soluble photographic processing reagents from a photographic image. Best results are obtained when the vinylpyridine polymer ranges from 30% by weight of the hydantoin condensation polymer and particularly when the two polymers are in approximately equal proportions.

The vinylpyridine polymer may be a vinylpyridine prepared by polymerizing or copolymerizing vinylpyridine or some derivative thereof. Examples of such a vinylpyridine homopolymer are poly-2-vinylpyridine, poly-3-vinylpyridine, poly-4-vinylpyridine, poly-5-vinyl-2-methyl pyridine, poly-2-vinyl-6-methyl pyridine, poly-2-methyl-5-vinylpyridine, and poly-2-vinyl-5-ethyl pyridine. Examples of such a vinylpyridine copolymer in which a polyvinylpyridine is the characteristic ingredient may be prepared by copolymerizing vinylpyridine or some derivative thereof with a monomer of suitable reactivity and double bond charge such as methyl acrylate, acrylonitrile, styrene and ethyl methacrylate. Such copolymers are produced from 2-vinylpyridine and methyl acrylate, from 2-vinylpyridine and methyl methacrylate, from 2-vinylpyridine and methylvinyl ketone, and from 2-vinylpyridine and acrylamide. The preparation of such vinylpyridine polymers is illustrated in U.S. Patent No. 2,491,472, issued in the name of J. Harmon on December 20, 1949. The use of such vinylpyridine polymers is illustrated in U.S. Patent No. 2,830,900, issued on April 15, 1958, to Edwin H. Land, Elkan R. Blout and Howard C. Haas.

The hydantoin formaldehyde condensation polymer has been found to plasticize the vinylpyridine polymer. It has been found, for example, that high temperature and humidity cause the vinylpyridine polymer to harden and the hydantoin formaldehyde condensation polymer to soften, whereas low temperature and humidity cause the vinylpyridine polymer to soften and the hydantoin formaldehyde condensation polymer to harden. Accordingly, in a mixture of these materials, variations in their properties, which result from variations in ambient humidity, counteract each other. Also, it has been found that whereas a vinylpyridine polymer yellows under intense light, a mixture of these materials retains its optical clarity under prolonged exposure to sunlight. Furthermore, it has been found that hydantoin formaldehyde condensation polymers, unlike many conventional plasticizers for vinylpyridine polymers, do not render a coating containing a mixture of the two materials pervious to elemental sulfur which, for example, may originate in sulfur-containing cardboards that come into contact with the coating. A preferred hydantoin formaldehyde condensation polymer is dimethyl hydantoin formaldehyde. Best results are obtained when the vinylpyridine polymer ranges from 30% to 200% by weight of the hydantoin formaldehyde condensation polymer.

The preferred composition for photographic purposes contains a salt of a heavy metal which forms an insoluble sulfide in a concentration sufficient to provide the coating formed on the face of the image when the composition is dried with a quantity of salt which is large relative to the quantity of silver in the image. Consequently, in accordance with the law of mass action, atmospheric sulfides which penetrate the coating react with the heavy metal salt in preference to the silver of the image. Preferably, the concentration of the heavy metal salt, by total weight of the preferred composition, ranges approximately from 1% to 15%. The heavy metal salt, preferably water soluble for example, contains a heavy metal cation such as cadmium, lead, manganese, germanium, zirconium and tin and an anion such as acetate, sulfate, nitrate and formate. The quantity of salt, although large relative to the quantity of silver in the image, should be so small that the salt and its sulfide do not appreciably affect the appearance of the image. Heavy metal salts which are pale in appearance and which react to form pale sulfides are preferred. The salts of zinc, in particular, are preferred because they and their sulfides are white.

The organic solvent, examples of which are low molecular weight alcohols such as methanol, ethanol and propanol, dioxane and low molecular weight ketones such as acetone and methylethyl ketone, and the acid, preferably weak, examples of which are acetic acid and propionic acid, cooperate to cause the vinylpyridine polymer, which is ordinarily insoluble in water alone, to dissolve. It is believed that salt formation by a proportion of the acid and a proportion of the basic groups of the vinylpyridine polymer is one of the driving forces for solution. In view of the fact that the heavy metal salt, when used and if properly chosen, may be acidic enough to participate in solubilizing the polymer, the acid may be omitted under such circumstances. The water-miscible organic solvent functions additionally to impart to the solution an overall quick-drying character.

The preferred composition may be prepared by dissolving the vinylpyridine polymer in the water, organic solvent and acid at a temperature ranging from room temperature to 40° C. under a reflux condenser to prevent evaporation of the alcohol. Thereafter, the dimethyl hydantoin formaldehyde and the heavy metal salt are stirred into the mixture. A preferred composition comprises the foregoing ingredients in the following proportions:

| Ingredient | Unit | Amount |
|---|---|---|
| Vinylpyridine polymer | g | 10–25 |
| Hydantoin formaldehyde condensation polymer | g | 5–30 |
| Salt of heavy metal having insoluble sulfide | g | 1–10 |
| Water | cc | 50–70 |
| Organic solvent | cc | 30–50 |
| Weak acid | cc | 0–5 |

Examples of photographic materials useful in the production of the photographic silver images, to which the foregoing preferred composition may be applied advantageously, are described in detail in Patent No. 2,543,181, issued in the name of Edwin H. Land on February 27, 1951, and in Patent No. 2,647,056, issued in the name of Edwin H. Land on July 28, 1953. In a typical process employing such materials, a processing composition containing a viscous aqueous solution of a silver halide developer, a silver halide solvent and an alkali is spread in a uniformly thin layer between the superposed surfaces of the photoexposed gelatino silver halide stratum of a photosensitive element and the silver-receptive stratum of an image-receptive element. The elements are maintained in superposed relation for a predetermined period, ordinarily of approximately 40 to 120 seconds in duration, during which exposed silver halide is reduced to silver and unreduced silver halide forms a water-soluble, complex silver salt which diffuses through the layer of composition to the image-receptive stratum, where, upon being reduced to silver, it forms a silver print. At the end of this period, the photosensitive element, preferably together with the layer of composition, is stripped from the image-receptive element.

An image-receptive stratum of the foregoing type in one form includes silver precipitating nuclei dispersed in a macroscopically continuous vehicle comprising submacroscopic agglomerates of minute particles of a water-insoluble, inorganic, preferably siliceous, material such as silica aerogel. Silver grains precipitated in the foregoing maner are concentrated primarily at the surface of this stratum. This stratum, both before and after receiving these precipitated silver grains, is extremely thin, preferably being approximately 1 to 8 microns thick. Materials of the foregoing type are specifically described in U.S. Patents Nos. 2,698,237 and 2,698,245, issued to Edwin H. Land on December 28, 1954.

Preferably, there is interposed between the image-receptive stratum and its support a water-impermeable layer capable of preventing the penetration of moisture from the processing liquid into the support. This layer is responsible for the production of a substantially dry image only shortly after the photosentive layer is stripped from it. The water-impermeable layer, for example, may be composed of unplasticized polymethacrylic acid or one of the cellulosic esters such as cellulose nitrate, cellulose acetate, cellulose butyrate, cellulose propionate, cellulose acetate butyrate, or cellulose acetate propionate. Preferred, however, are such rubbery polymers as polyvinyl butyral. If the support is water impermeable, of course, a discrete, water-impermeable layer need not be provided.

Alternatively, there is interposed between the image-receptive stratum and its support a plurality of layers which together impart not only impermeability to water but also to organic materials such as oils and plasticizers with which the support may come in contact. These layers are so constituted that one is impermeable to many of the organic materials which can penetrate the other. As a consequence, the two layers combined are impermeable to a wide variety of organic materials. Here, preferably, the two layers are formed of different high molecular weight polymers, i.e. plastics. Preferably, the layer adjacent to the support has a thickness of approximately .0004 inch and is formed of a cellulosic ester such as cellulose acetate which is free of plasticizer. Preferably, the layer which is remote from the support is a polyvinyl acetal such as polyvinyl butyral or an acrylic resin such as that sold under the trade name "Acryloid" and, in a preferred form, has a thickness of approximately .00015 inch. The plastic of the latter layer may contain a plasticizer such as dioctylphthalate, the methyl ester of rosin sold as Abalyn, the hydrogenated resin sold as Abytol, or the hydrogenated methyl ester rosin sold as Hercoyln, which are incompatible with cellulose acetate and therefore incapable of penetrating the former layer. A complete discussion of coacting layers of the foregoing type is found in U.S. Patent No. 2,789,054, issued to Edwin H. Land on April 16, 1957.

Preferably, the composition of the present invention is applied to a photographic silver image to be washed and protected by means of an absorbent applicator composed, for example, of flannel, cotton batting, or cellulose sponge charged with a composition. When the face of the image is swabbed with such an applicator, residual reagents in the image are dissolved and for the most part transferred into the applicator and the image becomes coated with a thin layer of the dispersion. The preferred composition referred to above, after being swabbed by means of such an absorbent applicator onto a thin photographic silver image of the above described type, rapidly dries under ordinary atmospheric conditions to form a coating having excellent protective properties for the image.

This application is a continuation-in-part of my copending U.S. application Serial No. 412,944, filed February 26, 1954, now U.S. Patent No. 2,874,045, issued February 17, 1959.

Since certain changes may be made in the above composition without departing from the scope of the invention herein involved, it is intended that all matter contained in the above description shall be interpreted as illustrative and not in a limiting sense.

What is claimed is:

1. As a new composition of matter, a mixture of a vinylpyridine polymer and a hydantoin formaldehyde condensation polymer.

2. The mixture of claim 1 wherein said vinylpyridine polymer ranges from 30% to 200% by weight of said hydantoin formaldehyde condensation polymer.

3. A composition of matter comprising a vinylpyridine polymer, a hydantoin formaldehyde condensation polymer and a salt of a heavy metal having a water-insoluble sulfide.

4. A composition of matter comprising an aqueous dispersion of a vinylpyridine polymer, a hydantoin formaldehyde condensation polymer and a salt of a heavy metal having a water-insoluble sulfide.

5. A composition of matter comprising a dispersion prepared from a vinylpyridine polymer, a hydantoin formaldehyde condensation polymer, a salt of a heavy metal having a water-insoluble sulfide, water, and a water-miscible organic solvent selected from the class consisting of the alcohols, dioxane, and the ketones.

6. The composition of matter of claim 5 wherein said vinylpyridine polymer is polyvinylpyridine.

7. The composition of matter of claim 5 wherein said vinylpyridine polymer ranges from 30% to 200% by weight of said hydantoin formaldehyde condensation polymer.

8. The composition of matter of claim 5 wherein said hydantoin formaldehyde condensation polymer is dimethyl hydantoin formaldehyde.

9. The composition of matter of claim 5 wherein said salt of a heavy metal is water soluble.

10. The composition of matter of claim 5 wherein said salt of a heavy metal contains cations selected from the group consisting of cadmium, lead, manganese, germanium, zirconium and tin, and anions selected from the group consisting of acetate, sulfate, nitrate and formate.

11. The composition of matter of claim 5 wherein said salt of a heavy metal is a zinc salt.

12. The composition of matter of claim 5 wherein said salt of a heavy metal is zinc acetate.

13. The composition of matter of claim 5 wherein said organic solvent is volatile.

14. The composition of claim 5 comprising an acid selected from the group consisting of acetic acid and propionic acid.

15. A coating composition comprising a dispersion of a vinylpyridine polymer, a hydantoin formaldehyde condensation polymer, water, a water-miscible organic solvent selected from the class consisting of the alcohols, dioxane and the ketones, and an acid selected from the class consisting of acetic acid and propionic acid.

16. A coating composition comprising a dispersion of polyvinylpyridine, dimethyl hydantoin formaldehyde, water, a water-miscible organic solvent selected from the class consisting of the alcohols, dioxane and the ketones, and an acid selected from the class consisting of acetic acid and propionic acid.

17. A coating composition comprising a dispersion of a vinylpyridine polymer, a hydantoin formaldehyde condensation polymer, water, a water-miscible organic solvent selected from the class consisting of the alcohols, dioxane and the ketones, an acid selected from the class consisting of acetic acid and propionic acid, and a salt of a heavy metal having a water-insoluble sulfide, said salt containing cations selected from the class consisting of cadmium, lead, manganese, germanium, zirconium and tin, and anions selected from the class consisting of acetate, sulfate, nitrate and formate.

No references cited.